(12) United States Patent
Boys

(10) Patent No.: US 6,317,338 B1
(45) Date of Patent: Nov. 13, 2001

(54) POWER SUPPLY FOR AN ELECTROLUMINESCENT DISPLAY

(75) Inventor: John Talbot Boys, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 0 days.

(21) Appl. No.: 09/423,364

(22) PCT Filed: May 4, 1998

(86) PCT No.: PCT/NZ98/00053

§ 371 Date: Nov. 8, 1999

§ 102(e) Date: Nov. 8, 1999

(87) PCT Pub. No.: WO98/50993

PCT Pub. Date: Nov. 12, 1998

(30) Foreign Application Priority Data

May 6, 1997 (NZ) .................................. 314754

(51) Int. Cl.[7] .................................. H02M 3/335
(52) U.S. Cl. .................................. 363/25; 307/104
(58) Field of Search .................................. 363/15, 16, 24, 363/25, 133; 307/104; 336/178; 315/307, 224, 291

(56) References Cited

U.S. PATENT DOCUMENTS

| 4,780,801 | 10/1988 | Gill et al. . | |
|---|---|---|---|
| 4,827,151 | 5/1989 | Okado . | |
| 5,121,032 | * 6/1992 | Han | 315/219 |
| 5,121,314 | 6/1992 | Cathell et al. . | |
| 5,450,305 | * 9/1995 | Boys et al. | 363/24 |
| 5,625,539 | 4/1997 | Nakata et al. . | |
| 5,705,895 | * 1/1998 | Mihara | 315/307 |
| 5,877,592 | * 3/1999 | Hesterman et al. | 315/106 |

FOREIGN PATENT DOCUMENTS 0 099 232   1/1984   (EP) .

* cited by examiner

Primary Examiner—Peter S. Wong
Assistant Examiner—Gary L. Laxton
(74) Attorney, Agent, or Firm—Young & Thompson

(57) ABSTRACT

Inductive power transfer across an extended gap (100) from a primary conductor (119) is provided by means of a resonant intermediate loop comprised of capacitor (118) with inductor (117) carrying a larger resonating current, that can in turn generate an inductive field to be collected by a pickup coil (120). This process and device find application in an electroluminescent advertising panel.

7 Claims, 4 Drawing Sheets

POWER SUPPLY FOR AN ELECTROLUMINESCENT DISPLAY

TECHNICAL FIELD OF THE INVENTION

Figure 1:
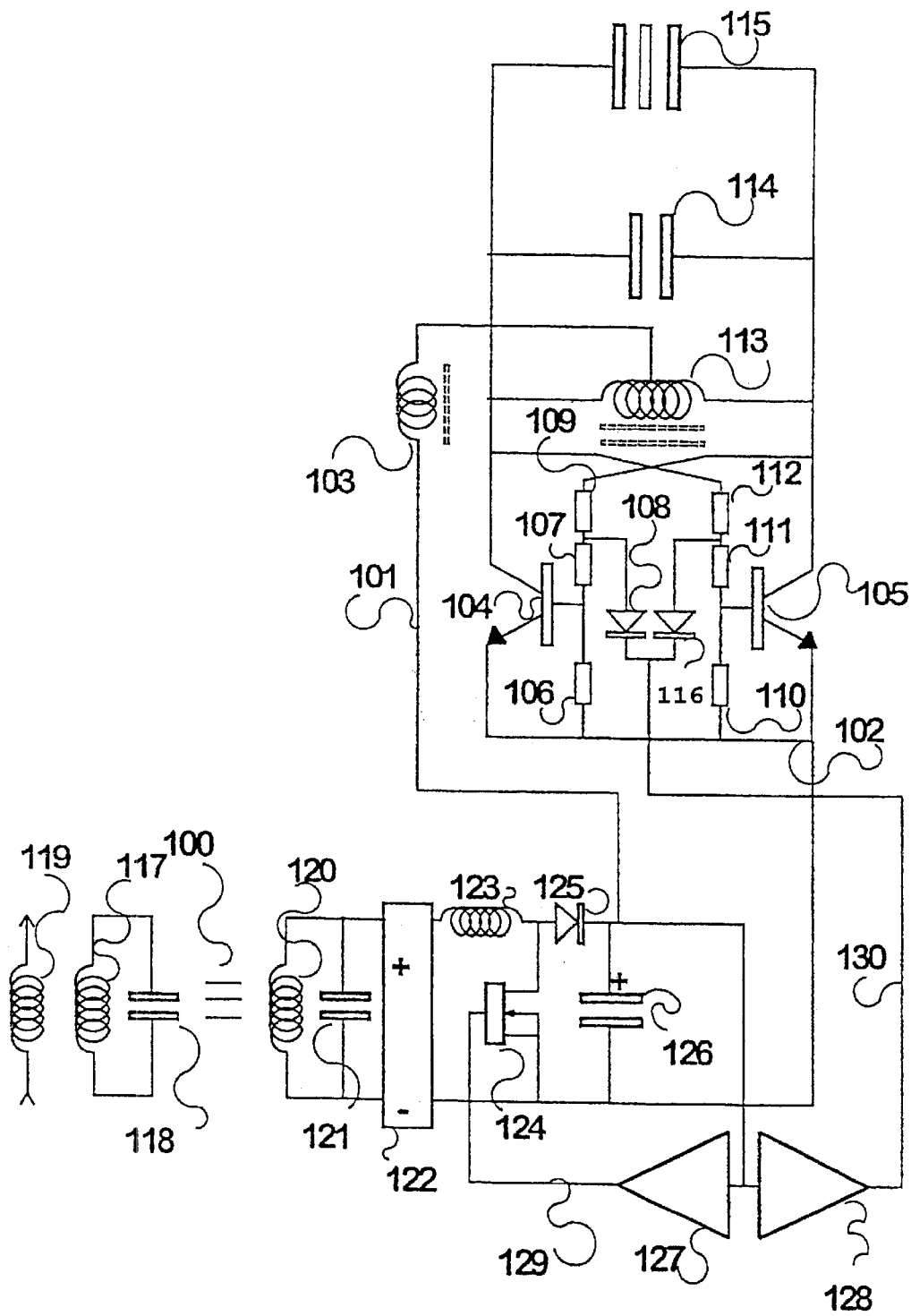

This invention relates to a power supply for an electroluminescent display, and to the use of inductive power transfer to provide power across an extended gap between a primary inductive trackway and a secondary pickup device, for a range of purposes including motive power, battery charging and lighting, including lighting using electroluminescent panels.

BACKGROUND

Inductive power transfer, although contactless, has in most applications in the prior art using primary pathways required that the configurations shall include ferromagnetic cores and that the secondary or pickup shall be quite closely placed in proximity to, or about the primary conductor. For example, Kelley in U.S. Pat. No. 4,833,337 uses elongated ferrite inverted "U" cores and a ferrite member fixed to the primary pathway as well. BOYS& Green (WO92/17929) use "E" cores with one primary conductor located inside each space between the three limbs of the "E". Bolger (U.S. Pat. No. 3,914,562) teaches a 120 Hz primary inductive cable along a roadway, the cable having iron laminations along its entire length. These laminations face corresponding laminations within the moving vehicles that draw power from the tracks. These are expensive, heavy constructions which will exhibit magnetic attraction forces and any magnetostrictive effects within the cores will tend to cause noise. For transferring power to moving road vehicles, avoidance of core structures (at least in the primary pathway) and a wider tolerance in positioning is clearly useful.

Inductive power transfer systems in which various portions of the system are tuned to resonance are somewhat liable to instability should one or more resonant circuits assume a different resonant frequency to that of the system mean. Means to enhance stability are always useful, given that resonance is in most cases the preferred way to optimise the transfer of inductive power.

There are many applications in attention-gathering fields (i.e. advertising) in which it will be useful to extend the gap over which a useful field can be transmitted under inductive power transfer principles. Advantages of doing this include the concealment of the power sources so that panels appear to magically light up without a visible connection. Hence the use of inductive power transfer, which itself may involve higher frequencies, as a way of driving electroluminescent panels across a gap and without bare wires or contacts is a useful venture.

Electroluminescent panels have been available since at least 1957 as a source of lighting or of display and advertising material, yet they have proven to be difficult to drive at an acceptable level of brightness and at the same time retain a reasonably long life. Panels require a relatively high frequency (well above mains frequency) in order to glow at a useful level. Prior-art driving circuits such as dedicated chips rely on inverters to develop AC power at typically 800–1200 Hz, and up to typically 50 V peak-to-peak. Because the output of those inverters is substantially a square-wave waveform the phosphors of the panels are not excited optimally and brightness is not remarkable. Attempts to get more light with higher driving voltage usually results in breakdown of the dielectric and a failure of the panel, or a markedly curtailed life. There may be thermal runaway effects involved.

OBJECT

It is an object of this invention to provide an improved way to drive loads such as (but not limited to) electroluminescent panels across a gap using inductively transferred electric power, or at least to provide the public with a useful choice.

STATEMENT OF THE INVENTION

In a first broad aspect the invention provides means for inductive power transfer across an extended gap between a primary conductor and a secondary resonant pickup circuit, the means comprising an intermediate resonant loop, resonant at a system-side resonant frequency and capable of being positioned within an inductive power transfer system so that inductive power is capable of being coupled inductively from the primary inductive conductor through the intermediate resonant loop to the at least one secondary resonant pickup circuit capable of collecting the inductive power.

Preferably the invention provides means for coupling inductive power as described in this section, wherein the intermediate resonant loop comprises a capacitance and an inductance, together resonant at the system-side resonant frequency.

Preferably the invention provides means for coupling inductive power as described elsewhere in this section, wherein the inductance may comprise at least one lumped inductance and at least one extended inductance.

Optionally the at least one element having inductance within the intermediate resonant loop may comprise at least one intermediate lumped inductance comprised of a sub-loop having one or more turns and at least one extended intermediate inductance being the inductance of the loop itself.

Preferably the invention provides means for coupling inductive power as described elsewhere in this section, wherein the at least one lumped inductance is capable of receiving inductive power from a primary conductor. Preferably the invention provides means for coupling inductive power as described elsewhere in this section, wherein the intermediate resonant loop is extended over a lateral distance so that one or more, spaced-apart, secondary resonant circuits may draw power from the intermediate resonant loop.

Preferably the invention provides means for coupling inductive power as described elsewhere in this section, wherein the intermediate resonant loop includes means to limit the amount of resonating current flowing.

Preferably the invention provides means for coupling inductive power as described elsewhere in this section, wherein the means to limit the amount of resonating current flowing includes means for at least partial decoupling of the intermediate loop from the primary conductor.

Preferably the invention provides means for coupling inductive power as described elsewhere in this section, wherein the secondary resonant circuit provides motive power to an electrically powered vehicle.

Preferably the invention provides means for coupling inductive power as described elsewhere in this section, wherein the intermediate resonant circuit is extended over a lateral distance beneath at least a part of a route taken by a vehicle, so that the intermediate resonant circuit is capable of providing power to the vehicle when the vehicle is situated adjacent to the position of the intermediate resonant circuit.

Preferably the invention provides means for coupling inductive power as described elsewhere in this section, wherein the intermediate resonant circuit provides a charging current to one or more battery units within a vehicle when the vehicle is situated adjacent to the position of the intermediate resonant circuit, such as at a bus stop.

Preferably the invention provides means for coupling inductive power as described elsewhere in this section, wherein the intermediate resonant circuit provides frequency stability to an inductively powered system.

Preferably the invention provides means for coupling inductive power as claimed in the preceding claim, wherein the intermediate resonant circuit includes active frequency-adjusting means or the like to overcome any system instability that may arise.

Preferably the invention provides means for coupling inductive power as described elsewhere in this section, wherein the intermediate resonant circuit provides a charging current to one or more battery units.

Preferably the invention provides means for coupling inductive power as described elsewhere in this section, wherein the secondary resonant circuit provides electric power to a light source. Preferably the invention provides means for coupling inductive power as described elsewhere in this section, wherein the electrically powered light source is an electroluminescent panel driven with substantially sine-wave alternating current at an effective voltage and at an effective frequency.

Preferably the invention provides means for coupling inductive power as described elsewhere in this section, wherein the intermediate resonant loop comprises at least one element having inductance and at least one element having capacitance, together forming a circuit resonant substantially at the system-wide resonant frequency, and in which the intermediate resonant loop is capable of intercepting an inductive field from the primary inductive pathway and thereby having an effective resonating current induced within it, the inductive field developed about the intermediate resonant loop being in turn capable of inducing a current within the secondary resonant circuit.

Preferably the invention provides means for coupling inductive power as described elsewhere in this section, wherein the at least one element having inductance within the intermediate resonant loop comprises at lest one lumped inductance comprised of a coil made from a fraction of a turn to a plurality of turns, the or each lumped inductance being situated at one position or, if the intermediate resonant loop has more than one lumped inductance, is situated at spaced-apart positions around the intermediate resonant loop, and at least one extended intermediate inductance is comprised of the inductance of the loop itself.

Preferably the invention provides means for coupling inductive power as described elsewhere in this section, wherein the orientation of the magnetic flux generated, when in use, about the intermediate lumped inductance is capable of enhancing the transfer of inductive power at that position. In another view, the inductive field developed, when in use, about the intermediate resonant loop may be caused to be concentrated at one or more predetermined positions by forming the intermediate resonant loop into a sub-loop having one or more turns at the or each position, so that the transfer of inductive power into or out of the inductive field developed, when in use, about the intermediate resonant loop is enhanced at the one or more predetermined positions.

Preferably the invention provides means for coupling inductive power over an extended distance from a primary, energised, inductive pathway having at least one conductor capable of carrying an alternating current having a system-wide consistent frequency, to a secondary resonant circuit capable of collecting the inductive power, the means comprising an intermediate resonant loop including at least one element having inductance and at least one element having a capacitance, together resonant at the system-wide resonant frequency, the intermediate resonant loop being capable of intercepting an inductive field from the primary inductive pathway and thereby having a current induced within it, the inductive field developed, when in use, about the intermediate resonant loop being in turn capable of inducing a current within the secondary resonant circuit so that in use it develops a substantial resonating current.

Preferably the lumped inductance is capable of receiving inductive power from a primary conductor, optionally connected to a primary lumped inductance adjacent to the intermediate lumped inductance.

Optionally the intermediate resonant loop may be extended over a lateral distance so that one or more, spaced-apart, secondary resonant circuits may draw power from the intermediate resonant loop.

Alternatively, the invention provides means to extend the distance between a source of changing magnetic fields and a magnetic field pickup means (including a secondary resonant circuit) over which an effective transfer of inductive power can take place, the means comprising a intermediate resonant circuit placed about the source of changing magnetic fields so that in use it develops a substantial resonanting current.

Preferably the intermediate resonant loop of the invention is provided as an accessory to be overlaid upon a primary resonant pathway, so that it is capable of intercepting at least some of the magnetic flux surrounding one or more conductors of the primary pathway.

Alternatively the intermediate resonant loop of the invention may be provided as an accessory to be laid over or about a secondary resonant circuit or pathway so that the loop collects a magnetic flux and forwards it to the secondary resonant circuit or pathway.

Optionally the invention provides means to improve the frequency stability of an inductive power transfer system including a primary, energised, inductive pathway having at least one conductor capable of carrying an alternating current having a system-wide consistent frequency, and one or more secondary resonant circuits capable of collecting the inductive power, the means comprising an intermediate resonant loop including at least one element having inductance and at least one element having a capacitance, together resonant at the system-wide resonant frequency, the intermediate resonant loop being capable of intercepting an inductive field from the primary inductive pathway and thereby having a current induced within it, the inductive field developed, when in use, about the intermediate resonant loop being in turn capable of inducing a current within the secondary resonant circuit so that in use it develops a substantial resonanting current, wherein the stabilising property depends on the reversal of the effect of a detuning or destabilising event as it crosses an inductive link between conductors, so that the addition of a second inductive link inherent in the use of an intermediate link between a primary and a secondary circuit causes the destabilising effect to be reversed twice.

In a second broad aspect the invention provides a power supply capable of receiving its electric power through an intermediate resonant loop as described elsewhere in this section, the power supply being capable of generating a substantially sine-wave alternating current at an effective voltage and an effective frequency for use with a capacitative load such as one or more electroluminescent panels; the power supply being itself supplied with electric power through an intermediate loop as described elsewhere in this section.

Preferably the invention provides a power supply as described elsewhere in this section, the power supply including a pair of switching devices driven in a complementary manner at the effective frequency, and includes an inductor capable of resonance at or about the effective frequency when connected to the capacitative load.

Preferably the invention provides a power supply as described elsewhere in this section, wherein the one or more electroluminescent panels are connected in parallel with a frequency-adjusting capacitance.

Preferably the invention provides a power supply as described elsewhere in this section, wherein the power supply includes a circuit comprising a first inductor of large inductance in series between a power supply and a centre tap of a second, resonating inductor of large inductance, the start and finish of the winding of the second inductor being connected to a second terminal of each of a pair of switches including current amplification properties, each first terminal of each switch being connected to the return line to the power supply, and each control terminal of each switch being connected via a resistor chain to the second terminal of the other switch, and the capacitative load being placed between the second terminals of the two switches. Optionally the invention provides a power supply as described elsewhere in this section, wherein the circuit may be functionally enabled or disabled by connecting an intermediate point in one or both resistor chains to a potential capable of reversibly interrupting oscillation, thereby halting the supply of sine wave power.

Optionally the invention provides a beverage dispenser including one or more electroluminescent panels within valves capable of controlling the flow of the beverage, wherein the electroluminescent panels are provided with power by a power supply as described elsewhere in this section from an inductive power distribution system over a space, the width of the space being enhanced by the inclusion of an intermediate resonant circuit, so that the effective distance between the electroluminescent panel and the source of inductive power may be increased.

Preferably the invention provides a power supply wherein the power supply includes a circuit comprising a first inductor of large inductance in series between a power supply and a centre tap of a second, resonanting inductor of large inductance, the start and finish of the winding of the second inductor being connected to a second terminal of each of a pair of switches including current amplification properties, each first terminal of each switch being connected to the return line to the power supply, and each control terminal of each switch being connected via a resistor chain to the second terminal of the other switch, and the capacitative load being placed between the second terminals of the two switches.

Preferably the invention provides a power supply as described elsewhere in this section, wherein the circuit may be functionally enabled or disabled by connecting an intermediate point in one or both resistor chains to a potential capable of reversibly interrupting oscillation, thereby halting the supply of sine wave power.

Optionally the power supply itself is supplied with electric power without the intervention of an intermediate loop as described elsewhere in this section.

Optionally the power supply itself is supplied with electric power from a utility rather than from an inductive power transfer system, in which case the power supply includes a circuit comprising a first inductor of large inductance in series between a power supply and a centre tap of a second, resonating inductor of large inductance, the start and finish of the winding of the second inductor being connected to a second terminal of each of a pair of switches including current amplification properties, each first terminal of each switch being connected to the return line to the power supply, and each control terminal of each switch being connected via a resistor chain to the second terminal of the other switch, and the capacitative load being placed between the second terminals of the two switches, but does not include a secondary resonant pickup circuit.

Optionally the invention provides a power supply as described elsewhere in this section, wherein the power supply itself is supplied with electric power from a conventional utility supply and the resonant secondary pickup aspect itself is absent.

Preferably the electric power is rectified.

DRAWINGS

The following is a description of a preferred form of the invention, given by way of example only, with reference to the accompanying diagrams.

FIG. 1: is a circuit diagram used to drive an electroluminescent panel with inductively transferred power, using a intermediate loop.

Figure 2:
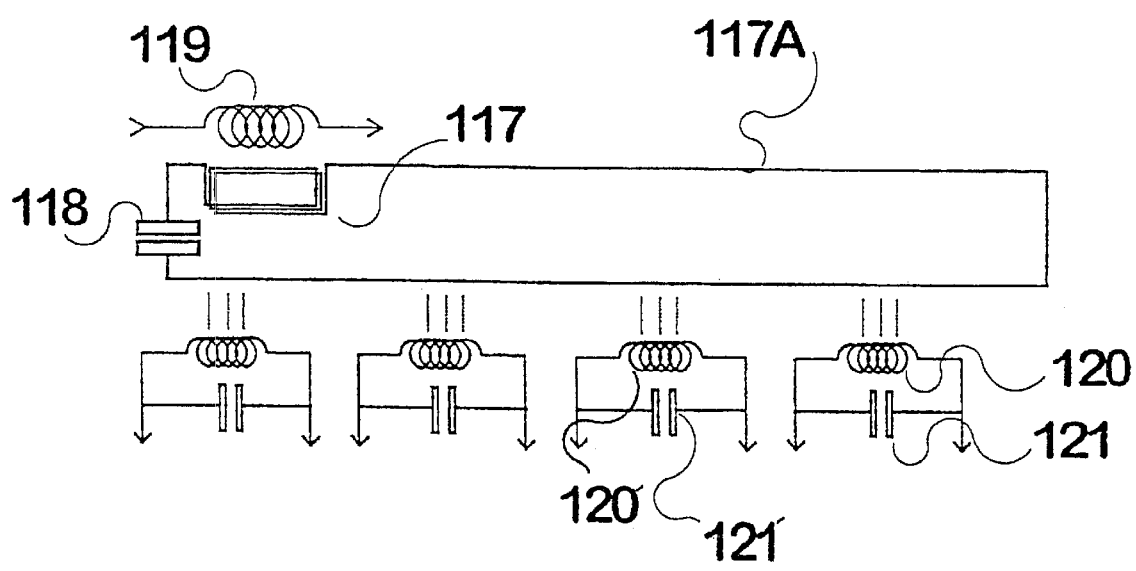

FIG. 2: is a circuit diagram showing the intermediate loop or circuit.

Figure 3:
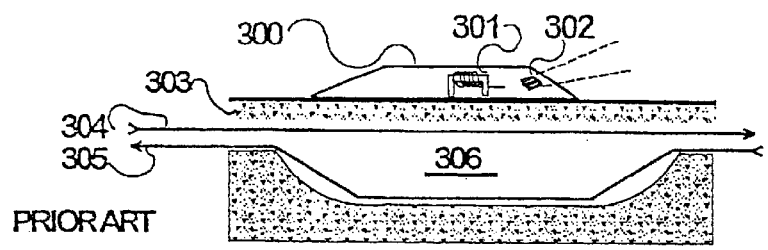

FIG. 3: is a prior-art diagram of a self-illuminated roadway stud, in section, when attached to a roadway.

Figure 4:
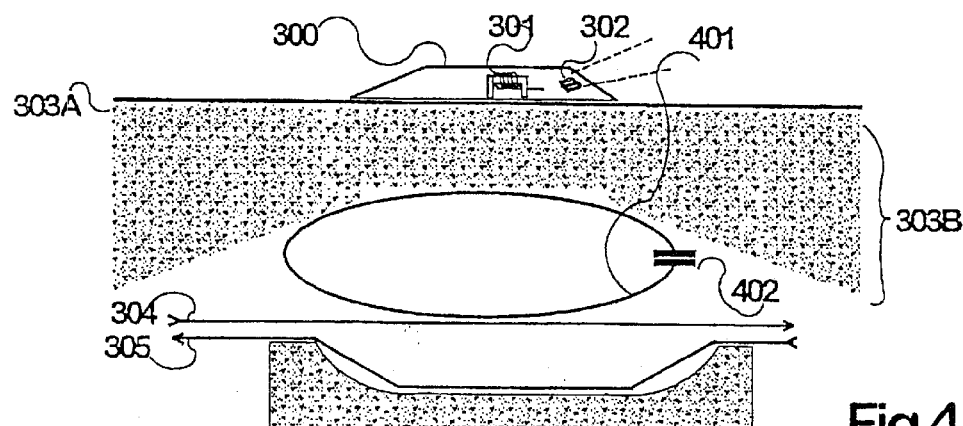

FIG. 4: is a diagram of a self-illuminated roadway stud using an intermediate loop to continue the power supply connection after more layers of seal have been applied.

Figure 5:
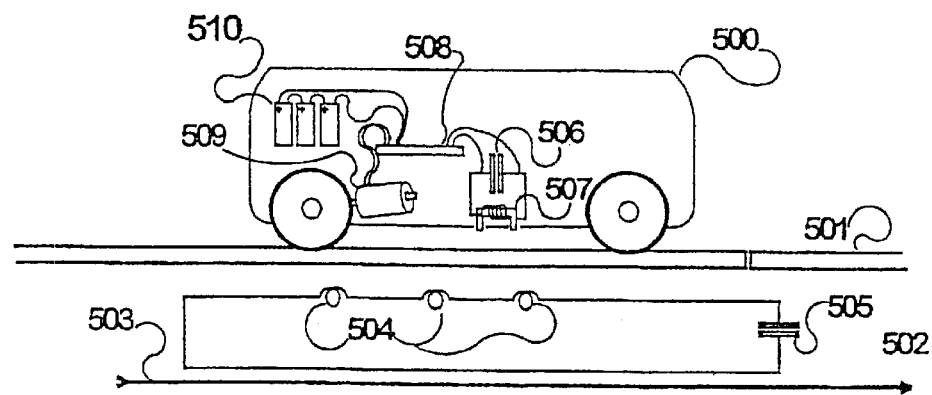

FIG. 5: is a sectional diagram of a vehicle, driven with inductively transferred power and an intermediate loop as part of the trackway.

Figure 6:
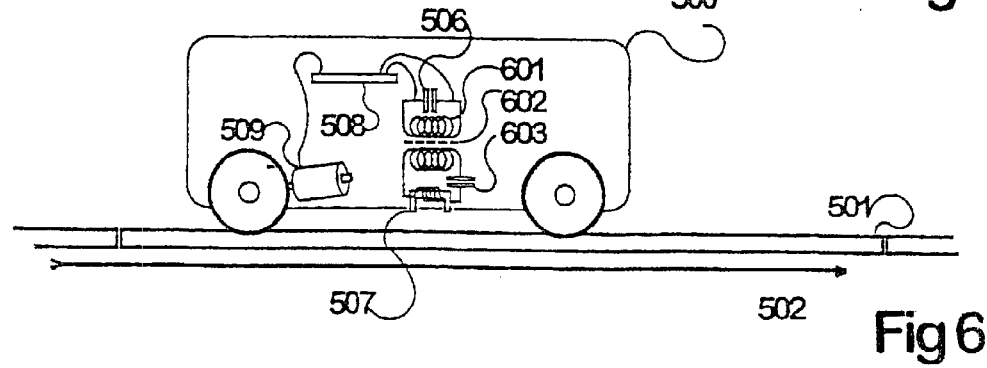

FIG. 6: is a sectional diagram of a vehicle, driven with inductively transferred power and an intermediate loop included within the vehicle.

Figure 7:
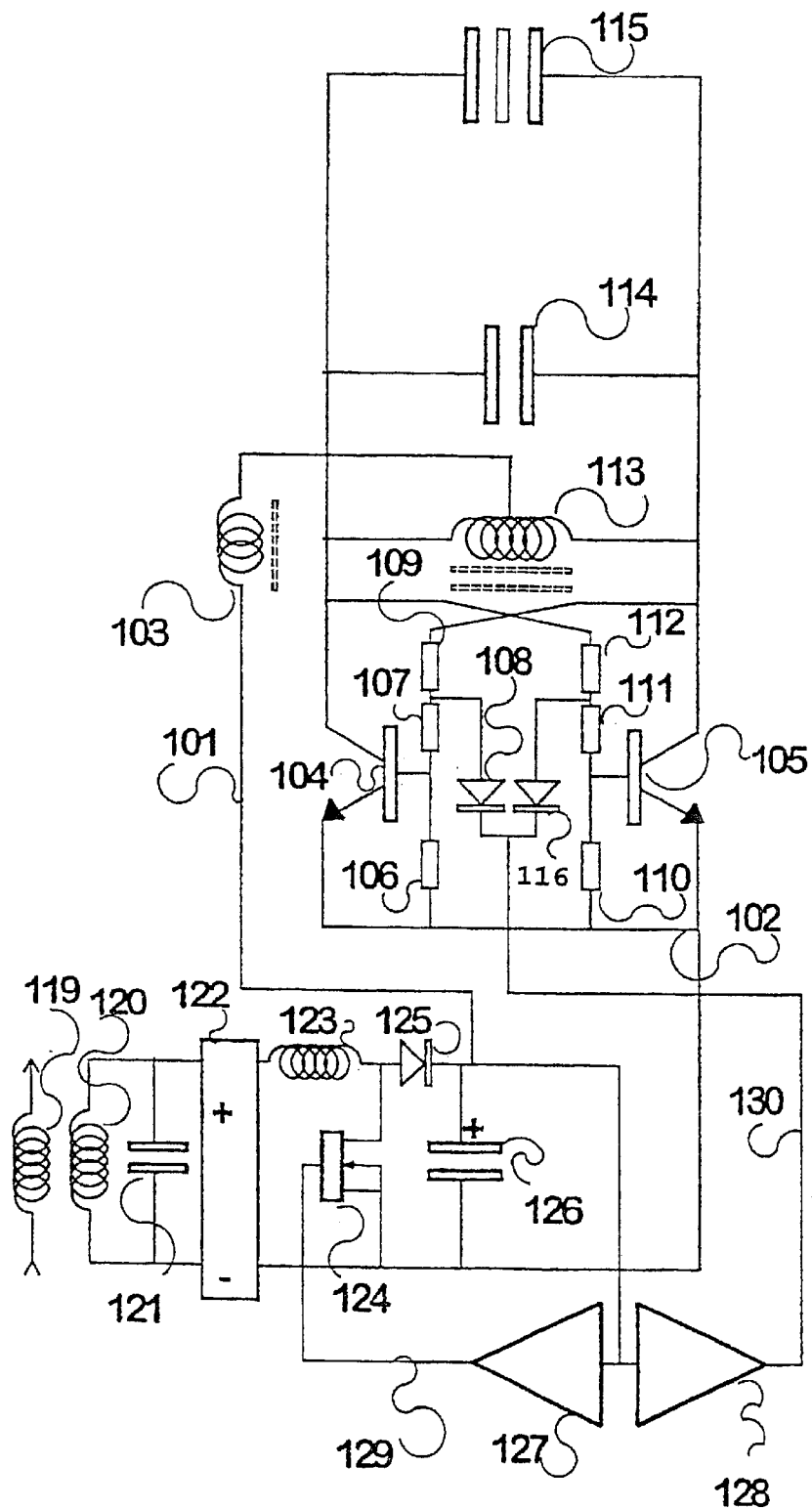

FIG. 7: is a circuit diagram used to drive an electroluminescent panel with inductively transferred power, without using an intermediate loop.

PREFERRED EMBODIMENT

APPLICATION EXAMPLE 1

Electroluminescent Panel

The invention will be described in relation to a particular application; driving an electroluminescent panel incorporated into a the handle of a beer tap as used in bars, where the panel serves as a background for advertising material. Clearly, the invention can be applied to other situations.

The circuit for driving an electroluminescent panel includes four sections: (a) DC to AC conversion producing a sine wave output at an optimal frequency, capable of driving the panel more effectively, (b) power pickup means, (c) secondary control means operating on rectified power, and (d) panel disabling means. Refer to FIG. 1.

Section (a) of the circuit is a DC to sine wave converter which is adapted or a capacitative load such as that of an electroluminescent panel 115. Electroluminescent panel 115 is a device having usually one transparent conductive plane, a dielectric layer including one or more phosphors capable of emitting light when excited, and a second conductive plane, so comprising a capacitor. The light emitted from an energized panel could be regarded as a result of the existence of a "lossy dielectric" because a change in the voltage field between the planes is required to excite the phosphor. The panels used are made with flexible plastics materials by the New Zealand manufacturer of the advertising displays, using DuPont phosphors and chemicals. A typical panel has an area of about 50 $cm^2$ and a capacitance of about 10 nF.

We found that conventional excitation with approximately square wave waveforms from purpose-designed integrated-circuit (IC) excitation devices (e.g. the Supertex HV803) resulted in about 120 Lux of emitted light, which is visible but not dramatic, Attempts to drive the panels harder, with more voltage, in order to get more light resulted in failure of either or both the panel and the IC driver and perhaps this is a result of the "impulse" nature of the step changes of a square wave drive being poorly matched to the requirements of the phosphor in terms of perceptible light. Perhaps thermal runaway effects occur during the failure process. In order to exercise the dielectric of a panel, and so excite the phosphors as efficiently as possible, it seems preferable to apply an AC waveform having a constant rate of change, such as a sine wave. We have confirmed that panels driven with a sine wave alternating current using a circuit according to this invention can radiate a considerably increased amount of light over an apparently long period before degradation or failure occurs. Accordingly, we have constructed a sine-wave power supply circuit capable of producing a reasonably pure sine wave when used with a capacitative load (including electroluminescent panels) yet having high conversion efficiency and a low parts count.

Referring to FIG. 1, 101 is a positive power input and 102 is a negative power input. 103 is an inductance of small physical size (total 13×13×9 mm) wound from 3500 turns of 0.05 mm insulated copper wire on an E-I ferrite coil former. It has an inductance of about 1.2 Henry. This part converts a voltage source such as our secondary pickup coil combination including a smoothing capacitor into a current source.

The active components in the circuit comprise 104 and 105, two NPN transistors in a cross-coupled type of circuit. Suitable transistors are rated for 200 V $V_{ceo}$ 250 mA, and have a β of about 40. (Steering diodes 108 and 116 simply provide for circuit disabling-see section (d)). The emitters of the transistors are connected to supply line 102; their bases are connected at the first junction (between 106 and 107) of a resistor chain comprising 106 (47 K), 107 (82 K), and 109 (330 K); or 110, 111, and 112 for the other transistor. The top ends of these resistor chains are connected to the collectors of the opposite transistors. Also connected between the collectors are the ends of 113, a center-tapped inductor otherwise like 103 which has the center tap connected to 103, and optionally one or more capacitors such as 114, used for frequency-adjusting purposes to reach the about 1200 Hz desired frequency, and 115, one or more electroluminescent panels. Inductor 113 serves as a resonating inductance and as a DC feed or splitter.

Note that the desired frequency is not related to the "first frequency" used for power distribution which is typically in the range of from 10 kHz up to perhaps 30 kHz, depending on switching device ratings, harmonic considerations, and the like.

The operating frequency may be trimmed by adjustment of capacitor 114 to run at about 1200 Hz with the about 10 nF preferred electroluminescent panel. The magnetizing inductance of the center tapped inductor 113, which serves as a DC feed and as part of a resonant circuit, is about 1.2 Hy. In use the circuit is fed at about 50 V DC which results in about 400 Lux of greenish light being emitted by the panel 115. For special effects such as flashing, the circuit can be switched off by disabling the base drives, actually by grounding the junction of the diodes 116 and 108 so interrupting signal and base current. On raising the diode voltage (above about 1.5 V, so that the diodes become non-conducting) the circuit rapidly (in about 2–3 cycles) builds up to its full amplitude of oscillation. The controller 128 provides this output. (We have not discussed in detail any actual control signals for enabling or disabling the circuit. These may be internally generated by a simple free-running multivibrator, for example, or may be picked up from an external source perhaps through the demodulation of control signals carried either through the primary conductor cable or as electromagnetic fields). Thus the circuit can be programmed to make the panel flash on and off, or be dimmed with a rapid enable/disable sequence. Brightness control is also possible by varying the applied voltage, as long as the ratings of the panel and other parts are not exceeded. The applied voltage could be varied by varying the reference voltage fed to the controller 127 for the shorting switch 124. Another mode of use of the comparator 128 is to inhibit the panel-driving converter when the bus voltage is under 40 volts, or enable it when the voltage is over 40 V. This has the effect in the target application of causing the panel to flash brightly and perhaps briefly, rather than fade into dimness, if the coupling to the pickup coil is reduced. In the target application this enhances human attention-gathering by the panel while in other applications this is a fail-safe feature for inadvertently reduced power transfer.

The power section will now be described. Integration of this circuit with an inductive pickup secondary circuit (sections (b) and (c)) is preferably as follows: A pickup coil 120, resonant with capacitor 121, can collect inductive power in the form of a changing magnetic field and convert it into AC. Typically we generate 10–140 kHz AC in a primary conductor or primary coil 119 to provide a changing magnetic field. The circulating current in the resonant tank circuit 120–121 is rectified in the bridge rectifier 122 and passed through an inductance 123 of typically 560 µH, intended to limit the peak current passing through a control switch 124 which is capable of shorting out the pickup coil (ignoring two diode voltage drops, of course). If the shorting switch is in a high-impedance state, rectified current flows through the steering diode 125 and along the bus 101 to charge up the smoothing capacitor 126, across which the supply voltage is developed. In this circuit, one comparator determines whether the bus 101 voltage is over 50 volts, in which case its output on line 129 goes high and turns ON the switch 124, or under 49 volts, when its output goes low. This output controls the switch 124.

Novel means for enhancing the gap length 100 over which inductively coupled inductive power transfer or ICIPT can be transferred are provided as follows (see both FIG. 1 and FIG. 2). An at least several times increase of the distance over which effective amounts of inductive power can be transferred is attainable. This aspect of the invention comprises placement of a simple intermediate resonant circuit 117, 118 having (in this example at least) no control means for active components or the like between a primary source of a changing magnetic field and the ultimate consumer or consumers. In FIG. 1 this novel resonant circuit is represented by the capacitor 118, the lumped inductance 117, where power is transferred into the circuit from a source of inductive power passing through the inductor 119 which may be a straight conductor or a coil, and the elongated conductor 117A. In practice, the elongated conductor might energize a number of pickups such as the four tank circuits, one labeled 120 (inductor) and 121 (capacitor), each corresponding to a circuit such as that of FIG. 1 and another labeled 120' and 121'.

The physical configuration of the intermediate circuit may be varied according to the application. Electrically it may be represented as inductor 117 and capacitor 118 in FIG. 1. The intermediate pickup coil can develop higher circulating currents or at least a higher magnetic flux than a primary energised conductor, and so transfer power over a greater gap length 100. An interesting observation about the intermediate resonant circuit 117/118 is that the overall stability of a system having extra resonant, tuned circuits of this type is improved. If one circuit (say 120, 121) is detuned away from resonance, its power factor changes in use so that for example the current leads the voltage. In a second circuit (say 117 and 118) inductively coupled to the first the power factor is reversed so that the voltage now leads the current. In situations where one inductively coupled link exists, the reversal leads to instability, but in situations where a second inductively coupled link to a third circuit (119) also exists, the power factor relationship is again reversed and so the intermediate link leads to an improvement in frequency stability. Of course, this power supply may be used to drive an electroluminescent panel or similar device without the aid of an intermediate loop. FIG. 7 shows such a power supply, practically identical to that of FIG. 1 but with the omission of the loop 117 and 118. Note that in FIGS. 1 and 7 the primary conductive pathway 119 need not have an actual discrete inductance, if sufficient current is flowing in a straight wire to provide an adequate flux.

Advantages of this power supply include that it renders an electroluminescent panel a much brighter, and hence more useful device. Furthermore, the increased brightness for a given peak voltage obtained with sine-wave driving seems to result in a greatly increased panel life, although the exact improvement of lifetime remains to be defined. We had been causing panels and drivers to fail when testing the prior-art square-wave driver circuit at higher voltages.

APPLICATION EXAMPLE 2A

Road Studs

FIG. 3 shows a prior-art view of a road stud (which is a device including a resonant secondary circuit, a control circuit to limit secondary current, and an array of light-emitting diodes intended as a self-lit "cat's eye" type of lane marker), in which the stud 300 is simply glued onto a road surface 303 above a previously cut slit containing primary inductive pathway conductors 304 and 305. Typically, the conductors are spread apart within the space 306 so that the magnetic field surrounding the upper conductor 304 is not partially cancelled out by the reverse field in 305. Inside the road stud there is a pickup inductor 301 (here shown side-on), resonating circuitry, power control and supply circuitry and a bank of light-emitting diodes 302 to provide a useful output.

One problem with this device is that after the road receives each of an often needed re-sealing, the distance over which the inductive field must travel to reach the stud becomes greater and may exceed the capability of a given field. (Studs can be hammered free of their adhesive and perhaps re-used if still functional). The principle of the intermediate loop of the invention is shown in FIG. 4, in which a greater thickness of road surface 303B has been added to the original, 302A. One way in which this invention can be used in practice is to cut a further slit in the new seal 303B with a diamond saw or the like, and insert an intermediate loop 401 made of a good conductor such as a litz wire (which has a high surface area and hence reduced losses at high frequency) with its resonating capacitor 402. The capacitor may be made as a flat, card-like object rather than the usual cylinder so that it falls into a narrow slit.

In laboratory tests, an intermediate resonant circuit comprising a number of turns of wire wound over two ferrite strips together with appropriate tuning capacitors was made up. This circuit is resonant at a system frequency and can be placed over a single wire of a primary conductive pathway. When the circuit is close to the single wire, the road stud can be excited to a level at which the control circuit becomes operative (perceived as an upper brightness limit) when it is about 10 cm away from the single wire. Without the intermediate resonant circuit, this distance is limited to about 3 cm.

Advantages of this intermediate loop include that the road can be re-sealed more times before the original primary conductive trackway becomes useless. The "reach" of the magnetic flux can be extended with the aid of intermediate loops. We expect that a stack of more than one intermediate loop will also work although it is possible that current-limiting means, perhaps a saturable inductor, may be required.

APPLICATION EXAMPLE 2B

Two Road Studs

One road stud close to the primary conductor can act as a intermediate resonant circuit for another road stud; here the intermediate circuit is not a simple passive inductor/capacitor circuit but is controlled by a shorting switch arrangement for decoupling the circuit in the event of too high a circulating voltage. This illustrates use of an intermediate loop incorporating a current limiting feature. Such a feature is useful in permitting primary current to pass an un-loaded intermediate loop and so reach further consuming devices.

APPLICATION EXAMPLE 3A

Vehicle Powered Through an Intermediate Loop Attached to the Trackway

FIG. 5 shows a vehicle 500, capable for example of running along an arrangement of rails 501, in which an electric motor 509 drives at last one wheel; the motor being fed from a set of motor control circuitry 508 which accepts AC power from a resonant pickup circuit comprised of a capacitor 506 and an inductor 507 preferably having a ferromagnetic core arranged so as to effectively intercept a flux from a supply. The primary conductor 503 running substantially parallel to the track has an intermediate coupling arrangement a loop of wire (preferably a litz wire, because it may carry a high resonating current) including optionally one or more discrete inductances 504 and a tuning capacitor 505. The inductances 504 have two functions; they aid in causing the loop to be electrically resonant at a system-wide resonant frequency, and they act as concentrated sources of inductive fields to be picked up by the vehicle. In some transport systems there may be an arrangement wherein higher power levels are desirable at certain spots, such as for acceleration. Or, a vehicle may normally be powered by rechargeable batteries 510, to be charged at certain designated spots such as "bus stops" along a fixed route. FIG. 5 could in fact be regarded as a sectional view through a bus stop having charging facilities. The intermediate loop allows effective charging to occur with an increased tolerance in the actual rest position.

Advantages of this invention include that power transfer may occur over greater distances. Thus a driver need not be so precise in positioning the bus over a charging conductor for recharging a bus battery. Reduced vertical positioning constraints allow a vehicle with a softer suspension. A product carrying conveyor device can supply increased power where the rails make an ascent. Incidentally, there may be simple battery charger applications where the increased gap distance is an advantage and, of course, the constant-current nature of loosely coupled inductive power transfer is an asset in changing batteries. The intermediate loop may allow increased power to be drawn from a primary conductor.

APPLICATION EXAMPLE 3B

Vehicle Powered Through an On-board Intermediate Loop

This version of the invention is similar to the arrangement shown in FIG. 6, except that the intermediate loop (including resonating capacitor 603, a part of a transformer, and a pickup inductor 507) is now carried within (or upon) the vehicle and serves a different function. The capacitor 506 and the part-inductor 601 represent the original secondary pickup coil and resonating capacitor. We have included a ferromagnetic core 602 as a convenient way to produce a more economical transformer.

In this example the advantage of the intermediate loop is that it acts as a system frequency stabilising device. Suppose for example that the vehicle resonant pickup comprised of 506 and 601 has shifted away from the system-wide frequency and as a result the phase of the current within the pickup resonant circuit is leading the phase of the voltage. As is well-known, on the other side of a transformer device (including an inductive pickup device), the phase of the voltage will now tend to lead the phase of the current. This inversion of the order tends to cause system instability. If an intermediate loop is used, then within the primary conductor the original leading by the current is restored as a result of passage of the power through a second transformer device— or inductive coupling means in this case. Hence the detuning of the vehicle is less likely to cause system instability; and increased system stability is a resulting advantage.

Intermediate loops may be constructed and sold as separate accessories suitable for use with inductive power transfer systems of various types. One of the variable to be considered when ordering loops is the existing resonant frequency of the system with which the intermediate loops are to be used.

APPLICATION EXAMPLE 4

Beer Tap Handles

This example integrates all the inventions described in this specification. Electrically, the beer tap handle circuit is that shown in FIG. 1, where the luminescent panel 115 is incorporated in the handle of a beer tap to act as an advertising accessory and attract the attention of consumers. In this instance, the reduced coupling that occurs when the handle is operated by being pulled away from a rest position has the effect of causing the hitherto steadily lit panel to not simply go dim, but enter a flashing mode wherein the brightness of each flash (which is of a reasonably long duration, depending on the size of capacitor 126) is comparable to the steady illumination (typically 400 Lux using the circuit of this invention) of the handle in its rest position.

The components (apart from 119, 117 and 118) of FIG. 1 are preferably installed in a concealed manner within each handle. Using surface-mount electronics size is not a problem. Refer to FIG. 2 for the physical appearance of an illuminated beer-tap handle for use in a bar.

The pickup coil (120) comprises perhaps 20 turns on a C-shaped core which may be cut from a toroidal core. In the example this is oriented vertically (i.e. along the axis of the handle) in order to collect flux emanating from the intermediate resonant loop 118–117. In FIG. 2, the rectangle 117A may be physically within a panel that passes close to each beer handle circuit (here suggested by the tank circuits 120, 121 etc.). In one corner a concentration of flux pick-up means 117 is provided and this is in use oriented close to a source of magnetic field such as a coil 119 driven by a resonant power supply converter (not shown) with a sine wave at typically 40 kHz in this application. The tuning capacitor 118 is generally located close to this coil. The primary coil 119 may be incorporated in a clip over the holder for the panel. In this particular application it is useful to be able to detach the panel including the coil 117/117A/118 and as there are no direct connections to it, this can be done easily. In fact the componentry can be totally concealed. The panel can be detachable in this application to permit access to the tap mechanism and for cleaning. The detachable panel may be cleaned, for it has no active, sensitive parts or exposed electrical connections.

When in place, this panel is held so that its particular pickup area 117 is in proximity to the energising primary coil, and its border is near one or more pickup coils, 120, 120' and so on; one on each beer tap.

Advantages of this system containing an intermediate resonant circuit for powering electroluminescent panels in a consumer-accessible and often wet region include (1) that there is no need to place relatively obtrusive primary coils adjacent to each tap, with wiring, and rigidly held in close relationship to toroids around the beer handles, so affecting the ability to clean the taps, and (2) that the distance over which effective coupling occurs is greater, so that precise positioning is not required and so that electroluminescent panels remain lit during movement of the beer tap handles. Several beer taps may be driven from the one intermediate circuit.

VARIATIONS

For a vehicle, the intermediate loop may be mounted over the fixed primary trackway within the road surface, for gap-widening purposes, or it may be mounted within the vehicle in relationship with the secondary pickup coil or coils, where it serves to increase stability.

We have not yet explored the operation of a intermediate circuit under high power operating conditions or where several intermediate circuits are to be driven simultaneously from a single primary conductor. Intermediate resonant loops circuits may also need to include control circuits to limit the total circulating power. One possible example of a control "circuit" is a saturable ferrite core within the tuning inductance. Another is back-to-back Zener diodes connected across the tuning capacitor, selected so as to break down when the circulating voltage exceeds a predetermined limit.

INDUSTRIAL APPLICATION (1) Improved drive circuitry for electroluminescent panels increases the range of possible applications for such panels. Prior-art drivers resulted in about 120 lux of emitted light, which is visible but not dramatic. 400 Lux was available with the circuit of this invention.

(2) Intermediate resonant circuits, by increasing the gap over which a given amount of power can be transferred inductively, can increase the number of applications for IPT. They can reduce the amount of primary current required, and/or reduce the size of a secondary pickup inductor, or they may reduce the requirements for precise alignment of the pickup coil with the primary conductor. For a road stud, which is an internally lit "cat's eye" device using light-emitting diodes, adequate function is obtained when it is about 10 cm away from the single wire. Without the intermediate resonant circuit, this distance is limited to about 3 cm. The intermediate resonant circuit itself is a simple and cheap device.

Finally, it will be appreciated that various alterations and modifications may be made to the foregoing without departing from the scope of this invention as set forth in the following claims.

What is claimed is:

1. An electroluminescent display system comprising an electroluminescent display and a power supply for the electroluminescent display, the power supply comprising:

a fist input terminal and a second input terminal for supplying substantially direct current electrical energy;

a three terminal inductive unit having a first outer terminal and a second outer terminal and a center-tap, the first and second outer terminals also being output terminals for supplying power to the electroluminescent display, and the center-tap being connected to the first input terminal, the three terminal inductive unit and the electroluminescent display comprises an electrically resonant circuit having a natural resonant frequency;

a first controllable switching device and a second controllable switching device, each said switching device having a closed state and an open state, the first switching device being connected between the second input terminal and the first outer terminal and the second switching device being connected between the second input terminal and the second outer terminal; and controlling means coupled to each of the switching devices for causing each of the switching devices to open and close alternately and in opposite phase to a state of the other switching device at a rate corresponding to an operating frequency that is approximately the natural resonant frequency of the resonant circuit, whereby a substantially sinusoidal supply of alternating current is supplied to the electroluminescent display.

2. The electroluminescent display system as claimed in claim 1, wherein the switching devices each have a control terminal and have current amplification properties, the control terminal of the first switching device being supplied with electrical energy from the second outer terminal, and the control terminal of the second switching device being supplied with electrical energy from the first outer terminal.

3. The electroluminescent display system as claimed in claim 2, wherein the power supply further comprises interruption means for interrupting the supply of power to the electroluminescent display, the interruption means including means for lowering an electric potential of the control terminal of each of said switching devices to thereby prevent the respective switching device from operating.

4. The electroluminescent display system as claimed in claim 1, further comprising a second inductive unit connected in series between the center-tap and the first input terminal to thereby provide substantially constant supply of current to the power supply.

5. The electroluminescent display system as claimed in claim 1, further comprising a capacitive unit connected between the output terminals, the capacitive unit having a capacitance value that provides the natural resonant frequency to the resonant circuit.

6. The electroluminescent display system as claimed in claim 1, further comprising a primary conductor and a secondary resonant pick-up circuit, wherein the supply of substantially direct current electrical energy is derived from the secondary resonant pick-up circuit into which electrical energy has been induced from the primary conductor.

7. The electroluminescent display system as claimed in claim 6, further comprising an intermediate resonant loop, the intermediate resonant loop being resonant at a selected frequency and being positioned between the primary conductor and the secondary resonant pick-up circuit whereby the intermediate resonant loop provides magnetic coupling between the primary conductor and the secondary resonant pick-up circuit so that electrical energy from the primary conductor may be induced into the secondary resonant pick-up circuit via the intermediate resonant loop.

* * * * *